United States Patent [19]

Eger

[11] 4,123,010
[45] Oct. 31, 1978

[54] ADAPTER HUB FOR A REEL

[75] Inventor: Donald M. Eger, Elkhart, Ind.

[73] Assignee: International Radio & Electronics, Inc., Elkhart, Ind.

[21] Appl. No.: 537,936

[22] Filed: Jan. 2, 1975

[51] Int. Cl.² ............................................. B65H 17/02
[52] U.S. Cl. ................................................. 242/68.3
[58] Field of Search .................. 242/68.3, 129.5, 129.7

[56] References Cited

U.S. PATENT DOCUMENTS

| | | | |
|---|---|---|---|
| 3,307,797 | 3/1967 | McFeaters et al. | 242/68.3 |
| 3,347,485 | 10/1967 | Bundschuh | 242/68.3 |
| 3,375,995 | 4/1968 | Roman | 242/68.3 |
| 3,482,794 | 12/1969 | Beardsley | 242/68.3 |

Primary Examiner—Harvey C. Hornsby
Assistant Examiner—John M. Jillions
Attorney, Agent, or Firm—Oltsch, Knoblock & Hall

[57] ABSTRACT

A hub which is mountable to a spindle shaft and which is utilized for the purpose of adapting the shaft to accommodate a reel of differing type from that normally carried by the shaft. The hub includes a side wall carrying a plurality of spring biased plungers which are designed, when the hub is attached to the spindle shaft, to lock the reel to the hub in such a manner that more force must be exerted to remove the reel from the hub than to place the reel upon the hub.

9 Claims, 5 Drawing Figures

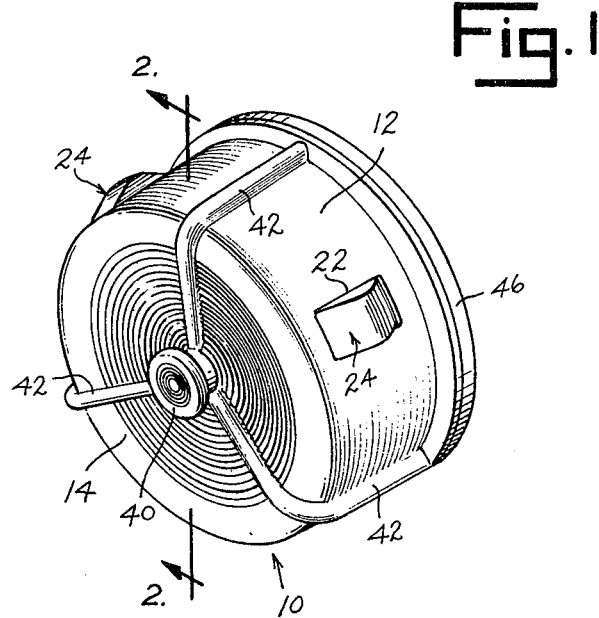
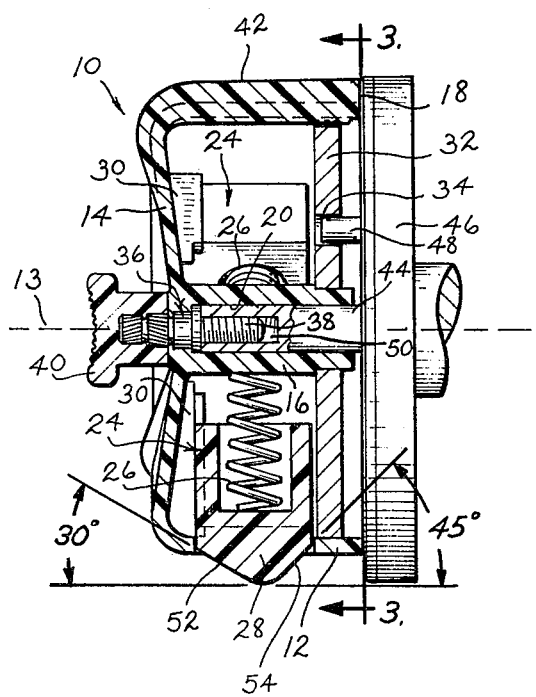
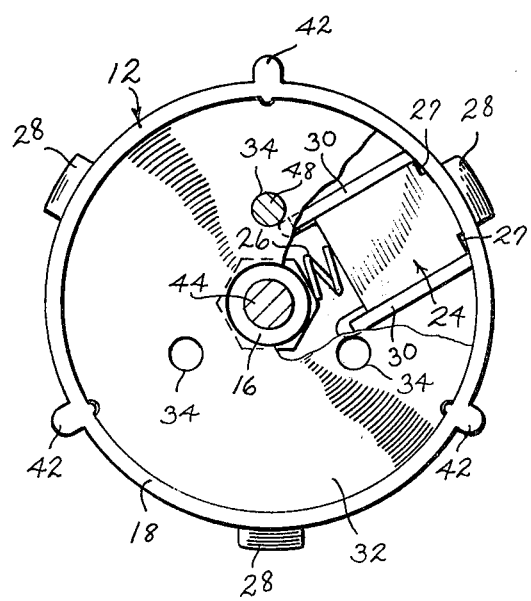

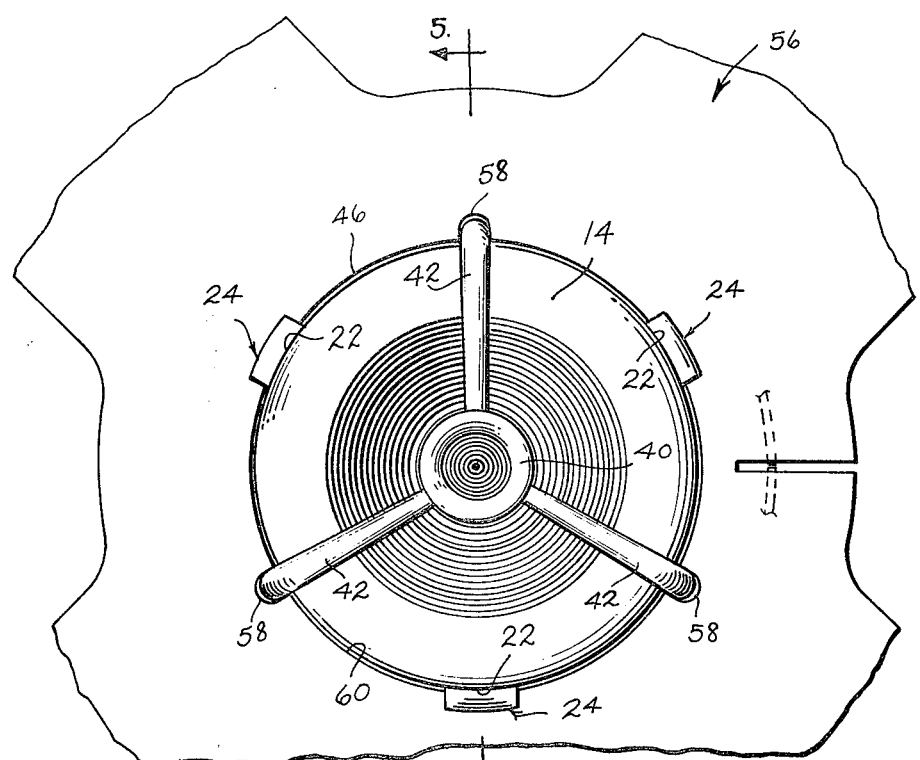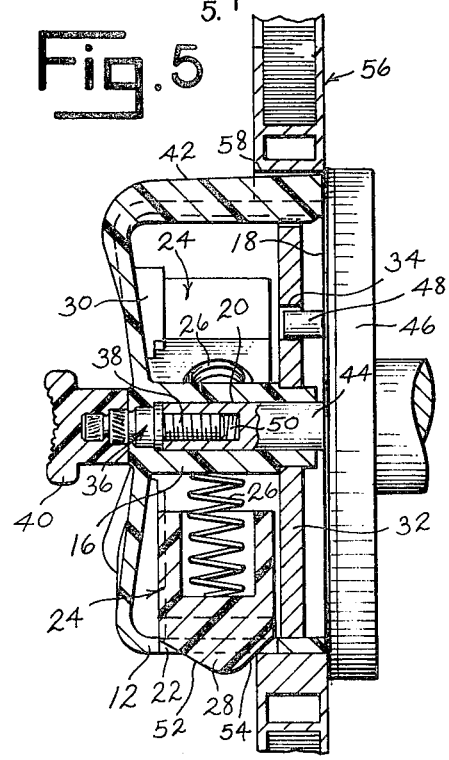

4,123,010

ADAPTER HUB FOR A REEL

Summary of the Invention

This invention relates to a hub utilized to secure a reel of recording or similar tape to a turntable and will have specific application to adapting the spindle shaft of the turntable to accommodate reels of different types.

The hub of this invention is connected to the spindle shaft which projects outwardly from the turntable and includes a side wall which carries a plurality of outwardly projecting spring biased plungers. The plungers serve to lock the reel upon the hub and include beveled side faces which require a greater force to be utilized by the user is removing the reel from the hub than in fitting the reel upon the hub.

Accordingly, it is an object of this invention to provide a hub which is attachable to the spindle shaft of a turntable for the purpose of adapting the shaft to accommodate reels of different types.

Another object of this invention is to provide an adapter hub which is for a reel of recording or similar tape and which is of economical construction.

Still another object of this invention is to provide an adapter hub for a reel in which a greater force is required to remove the reel from the hub than to fit the reel upon the hub.

Still another object of this invention is to provide an adapter hub which is for a reel of recording or similar tape and which is of reliable and simple operation.

Other objects of this invention will become apparent upon a reading of the invention's description.

Brief Description of the Drawings

A preferred embodiment of this invention has been chosen for purposes of illustration and description wherein:

FIG. 1 is a perspective view of the hub of this invention connected to a spindle shaft.

FIG. 2 is a sectional view of the hub taken along line 2—2 of FIG. 1.

FIG. 3 is a sectional view taken along line 3—3 of FIG. 2 with a portion of the hub broken away for purposes of illustration.

FIG. 4 is a view of the hub showing a reel in fragmentary form mounted thereto.

FIG. 5 is a sectional view of the hub and reel taken along line 5—5 of FIG. 4.

DESCRIPTION OF THE PREFERRED EMBODIMENT

Hub 10 shown in the drawings includes a cylindrically shaped body defined by a side wall 12 and an end wall 14. A center post 16 is formed concentrically within side wall 12 extending along the axis 13 of the hub. Post 16 is connected at one end to end wall 14 and terminates at its opposite end slightly inwardly spaced from the plane of edge 18 of the side wall. A bore 20 extends through post 16 and is aligned with hub axis 13.

Side wall 12 has three rectangular shaped openings 22 formed in it. Openings 22 are all spaced approximately the same distance from edge 18 of the side wall and are equal angularly positioned relative to the axis of the hub. A plunger 24 is located between post 16 and each opening 22. A spring 26 is located between each plunger 24 and post 16 and serves to urge the plunger into contact with side wall 12. Plungers 24 include arcuate end parts 28 which normally protrude outwardly from openings 22 as the plungers are urged into contact at shoulders 27 with side wall 12 by springs 26. In FIG. 3 one plunger 24 is shown to illustrate the typical construction of each of the three plungers. Each plunger 24 fits between parallel guides 30 located upon the interior of end wall 14 which enable the plunger to be shifted between the extended position shown in the figures and a retracted position in which end part 28 of the plunger is substantially even with the outer surface of side wall 12 such as when a reel is being applied to or removed from hub 10.

Hub 10 includes a disk-shaped plate 32 which is fitted within side wall 12, slightly inset from side wall edge 18, and which extends about post 16. Plate 32 may be connected to the side wall 12 of the hub in any of a variety of manners, such as by an adhesive or bonding agent. Plate 32 includes three locating openings 34 which can be best seen in FIG. 3 and which are preferably equal angularly spaced apart and located angularly between plungers 24. A securement screw 36 is carried by end wall 14. The threaded end 38 of screw 36 extends into bore 20 in post 16. The opposite end of screw 36 is connected to a turn knob 40 which is located exteriorly of end wall 14.

Three exteriorly positioned elongated lugs or ribs 42 extend from the edge 18 of side wall 12 in parallel fashion to end wall 14 and across end wall 14 in a radial direction toward knob 40. Ribs 42 are equal angularly spaced.

In each of the illustrated figures, hub 10 is shown attached to a spindle shaft 44 which extends outwardly from a turntable 46. Hub 10 is connected to spindle shaft 44 by placing the hub upon the turntable with the shaft entering bore 20 in post 16. The drive pin 48 mounted upon turntable 46 for engagement with a NAB type B reel is fitted into an opening 34 in plate 32 upon rotation of hub 10. Once drive pin 48 is located within a plate opening 34, knob 40 is turned to cause threaded end 38 of screw 36 to enter the threaded bore 50 in spindle shaft 44. Depending upon the length of the spindle shaft, side wall edge 18 may or may not contact the turntable.

End part 28 of each plunger 24 is formed with converging beveled faces 52 and 54. Each face 52 is formed at approximately a 30 degree angle to the axis 13 of hub 10 and each face 54 is formed at approximately a 45 degree angle to the hub axis. As reel 56 which is shown in FIGS. 4 and 5 and which is of a NAB type A reel is fitted over the spindle shaft secured hub 10, the drive grooves 58 formed within the margin of the mounting opening 60 in the reel are aligned with and receive ribs 42 of the hub. The marginal edge of reel opening 60 first contacts faces 52 of plungers 24 causing the plungers to be cammed from their extended positions shown in the figures into retracted positions which allow the reel to pass over the plungers and to be seated adjacent turntable 46 as shown in FIG. 5. Springs 26 cause plungers 24 to be urged toward their extended positions with plunger faces 54 contacting the marginal edge of reel opening 60 to cause the reel to be secured to the spindle shaft 44 and turntable 46.

When it is desired to remove reel 56 from hub 10, the reel is pulled outwardly with the reel first sliding across faces 54 of the plungers which causes the plungers to be cammed into their retracted positions to free the reel. The difference in angle of bevel of faces 52 and 54 is such that a greater force will be required to cam the plungers into their retracted positions when the reel is being removed from hub 10 than is required to cam the plungers into their retracted positions when the reel is being fitted onto the hub. This is added assurance that the reel will not accidentally become disconnected from the hub during use. By having ribs 42 extend across end wall 14 of the hub, the location of the ribs will be visible when reel 56 is being placed upon the hub to assist in aligning drive grooves 58 in the reel with the ribs.

It is to be understood that the invention is not to be limited to the details above given but may be modified within the scope of the appended claims.

What I claim is:

1. An adapter hub for a reel, said hub being mountable to a spindle shaft carried upon a turntable and comprising a body defined by a continuous side wall and an end wall, said side wall including an edge oppositely located from said end wall and having at least two openings formed therein angularly disposed about the side wall and spaced between said side wall edge and said end wall, a plunger means carried by said body and received within each side wall opening, said body including lug means projecting outwardly from said side wall for anchoring said reel against rotation relative to the body, said body including means defining a central bore therein for receiving said spindle shaft, means for releasably securing said body to said spindle shaft for rotation with the shaft with said side wall edge located adjacent said turntable and with the shaft received within said bore, a spring means partially compressed between and contacting said bore defining means and each plunger means for urging each plunger means laterally of said side wall into an extended position projecting outwardly from its side wall opening, each plunger means being shiftable with the compressive yielding of its contacting spring means into a retracted position within said body, each plunger means including a generally V-shaped reel contacting part which projects from said side wall when the plunger means is in its extended position, each reel contacting part including a first beveled face means extending at a first angle for urging the plunger means thereof into its retracted position as said reel is fitted onto said body and a second beveled face means extending at a second angle for overlying said reel to secure said reel to the hub and for urging the plunger means thereof into its retracted position as said reel is removed from said body.

2. The adapter hub of claim 1 wherein the second angle of said second face means exceeds that of the first angle of said first face means of each reel contacting part whereby a greater force will be required to remove said reel from said body than to fit said reel upon said body.

3. The adapter hub of claim 1 wherein said means for securing said body to said spindle shaft includes a securement member carried by said end wall and engageable with said spindle shaft.

4. The adapter hub of claim 3 wherein said lug means includes a rib extending along said side wall from said edge thereof to said end wall.

5. The adapter hub of claim 4 wherein said rib extends radially over said end wall.

6. The adapter hub of claim 5 wherein said lug means constitutes three ribs equal angularly spaced apart.

7. The adapter hub of claim 3 and including means carried by said body for engaging said turntable to prevent relative rotation between the hub and turntable.

8. The adapter hub of claim 1 wherein there are three of said plunger means equal angularly spaced apart, each plunger means located an equal distance above said side wall edge.

9. The adapter hub of claim 8 wherein each plunger means includes an arcuate portion joining its said first and second face means.

* * * * *